(12) United States Patent
Li et al.

(10) Patent No.: US 8,953,641 B2
(45) Date of Patent: Feb. 10, 2015

(54) METHODS AND APPARATUS FOR MULTI-CARRIER COMMUNICATIONS WITH VARIABLE CHANNEL BANDWIDTH

(75) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Intellectual Ventures II LLC, Wilmington, DE (US)

( * ) Notice: Subject to any disclaimer, the term of this patent is extended or adjusted under 35 U.S.C. 154(b) by 581 days.

(21) Appl. No.: 12/870,617

(22) Filed: Aug. 27, 2010

(65) Prior Publication Data

US 2010/0322119 A1 Dec. 23, 2010

Related U.S. Application Data

(63) Continuation of application No. 10/583,534, filed as application No. PCT/US2005/014828 on Apr. 29, 2005, now Pat. No. 7,787,431.

(60) Provisional application No. 60/567,233, filed on May (Continued)

(51) Int. Cl.
*H04J 1/00* (2006.01)
*H04L 5/14* (2006.01)
(Continued)

(52) U.S. Cl.
CPC ............ *H04L 5/0064* (2013.01); *H04L 5/0094* (2013.01); *H04L 5/0007* (2013.01); *H04L 5/0021* (2013.01); *H04L 5/0028* (2013.01); *H04L 5/0048* (2013.01); *H04W 72/00* (2013.01); *H04W 48/16* (2013.01); *H04L 5/0044* (2013.01); *H04L 5/0041* (2013.01);

(Continued)

(58) Field of Classification Search
None
See application file for complete search history.

(56) References Cited

U.S. PATENT DOCUMENTS 5,761,190 A * 6/1998 Yamauchi et al. ............ 370/210
5,793,757 A 8/1998 Uddenfeldt
(Continued)

FOREIGN PATENT DOCUMENTS

WO 2005109705 4/2005
WO 2005074305 8/2005
(Continued)

OTHER PUBLICATIONS

Yi et al., "Orthogonal multicarrier bandwidth modulation scheme for wireless communications," The 13th IEEE International Symposium on Personal Indoor and Mobile Radio communications, Sep. 2002, vol. 5, pp. 2054-2058.

(Continued)

*Primary Examiner* — Khoa Huynh
(74) *Attorney, Agent, or Firm* — Schwabe, Williamson & Wyatt, P.C.

(57) ABSTRACT

Methods and apparatus for multi-carrier communication with variable channel bandwidth are disclosed, where the time frame structure and the OFDM symbol structure are invariant and the frequency-domain signal structure is flexible. In one embodiment, a mobile station, upon entering a geographic area, uses a core-band to initiate communication and obtain essential information and subsequently switches to full operating bandwidth of the area for the remainder of the communication. If the mobile station operates in a wide range of bandwidths, the mobile station divides the full range into sub-ranges and adjusts its sampling frequency and its FFT size in each sub-range.

38 Claims, 10 Drawing Sheets

Related U.S. Application Data 1, 2004, provisional application No. 60/540,032, filed on Jan. 29, 2004, provisional application No. 60/544,521, filed on Feb. 13, 2004, provisional application No. 60/542,317, filed on Feb. 7, 2004, provisional application No. 60/551,589, filed on Mar. 9, 2004.

(51) Int. Cl.
| | |
|---|---|
| *H04L 5/00* | (2006.01) |
| *H04W 72/00* | (2009.01) |
| *H04W 48/16* | (2009.01) |
| *H04W 76/02* | (2009.01) |
| *H04L 27/26* | (2006.01) |

(52) U.S. Cl.
CPC ............ *H04L 5/1469* (2013.01); *H04W 76/02* (2013.01); *H04L 27/2613* (2013.01)
USPC .......................................... 370/482; 709/226

(56) References Cited

U.S. PATENT DOCUMENTS

| | | | |
|---|---|---|---|
| 5,864,546 A | 1/1999 | Campanella | |
| 5,991,308 A | 11/1999 | Fuhrmann et al. | |
| 6,094,576 A * | 7/2000 | Hakkinen et al. | 455/422.1 |
| 6,175,550 B1 | 1/2001 | Van Nee | |
| 6,243,424 B1 * | 6/2001 | Kroeger et al. | 375/265 |
| 7,372,909 B2 | 5/2008 | Miyoshi | |
| 7,376,424 B2 | 5/2008 | Kim et al. | |
| 7,787,431 B2 | 8/2010 | Li et al. | |
| 2002/0018527 A1 | 2/2002 | Vanderaar et al. | |
| 2002/0142777 A1 | 10/2002 | McGovern et al. | |
| 2003/0162535 A1 * | 8/2003 | Nishiyama et al. | 455/422 |
| 2003/0189893 A1 * | 10/2003 | Richardson | 370/208 |
| 2004/0042534 A1 * | 3/2004 | Raphaeli et al. | 375/150 |
| 2004/0047368 A1 * | 3/2004 | Xu | 370/509 |
| 2004/0153767 A1 * | 8/2004 | Dolgonos | 714/18 |
| 2004/0224691 A1 | 11/2004 | Hadad | |
| 2005/0180314 A1 | 8/2005 | Webster | |
| 2005/0201476 A1 | 9/2005 | Kim et al. | |
| 2006/0114812 A1 | 6/2006 | Kim et al. | |
| 2007/0008917 A1 * | 1/2007 | Calcagno et al. | 370/328 |

FOREIGN PATENT DOCUMENTS

| | | |
|---|---|---|
| WO | 2005078976 | 8/2005 |
| WO | 2005081439 | 9/2005 |
| WO | 2005088853 | 9/2005 |

OTHER PUBLICATIONS

International Search Report and Written Opinion, issued in International Application No. PCT/US2005/014828, mailed Dec. 27, 2005, 5 pages.

Office Action for Chinese Patent Application No. 200580012992.9; Date of mailing Jan. 29, 2010, 4 pages.

International Preliminary Report on Patentability, issued in International Application No. PCT/US2005/014828, mailed Nov. 1, 2006, 5 pages.

Notice of Allowance, issued in U.S. Appl. No. 10/583,534, mailed Apr. 30, 2010, 8 pages.

Office Action, issued in U.S. Appl. No. 10/583,534, mailed Apr. 28, 2009, 21 pages.

Office Action, issued in U.S. Appl. No. 10/583,534, mailed Jan. 7, 2010, 20 pages.

Yaghoobi, H., "Scalable OFDMA Physical Layer in IEEE 802.16 WirelessMAN," Intel Technology Journal, Aug. 20, 2004, vol. 8, Issue 3, pp. 201-212.

International Preliminary Report on Patentability, issued in International Patent Application No. PCT/US2005/014828, mailed Nov. 1, 2006, 6 pages.

\* cited by examiner

METHODS AND APPARATUS FOR MULTI-CARRIER COMMUNICATIONS WITH VARIABLE CHANNEL BANDWIDTH

CROSS-REFERENCE TO RELATED APPLICATION(S)

This application is a continuation of U.S. patent. application Ser. No. 10/583,534 (the '534 application) filed Jun. 5, 2007, now U.S. Pat. No. 7,787,431. The '534 application is a National Stage Application and claims the benefit of PCT Application No. PCT/US05/14828, filed on Apr. 29, 2005 (the '828application). This application, as well as the '534 application and the '828 application, claim the benefit of U.S. Provisional Patent Application No. 60/567,233, filed on May 1, 2004. This application also relates to PCT Application No. PCT/US2005/001939 filed Jan. 20, 2005, which claims the benefit of U.S. Provisional Application No. 60/540,032 filed Jan. 29, 2004; PCT Application No. PCT/US2005/004601 filed Feb. 14, 2005, which claims the benefit of U.S. Provisional Application No. 60/544,521 filed Feb. 13, 2004; PCT Application No. PCT/US2005/003889 filed Feb. 7, 2005, which claims the benefit of U.S. Provisional Application No. 60/542,317 filed Feb. 7, 2004; and PCT Application No. PCT/US2005/008169 filed Mar. 9, 2005, which claims the benefit of U.S. Provisional Application No. 60/551,589 filed Mar. 9, 2004.

BACKGROUND

While it is ideal fore broadband wireless communication device to be able to roam from one part of the world to another, wireless communication spectra are heavily regulated and controlled by individual countries or regional authorities. It also seems inevitable that each country or region will have its own different spectral band for broadband wireless communications. Furthermore, even within a country or region, a wireless operator may own and operate on a broadband spectrum that is different in frequency and bandwidth from other operators. The existing and future bandwidth variety presents a unique challenge in designing a broadband wireless communication system and demands flexibility and adaptability.

Multi-carrier communication systems are designed with a certain degree of flexibility. In a multi-carrier communication system such as multi-carrier code division multiple access (MC-CDMA) and orthogonal frequency division multiple access (OFDMA), information is multiplexed on subcarriers that are mutually orthogonal in the frequency domain. Design flexibility is a result of the ability to manipulate parameters such as the number of subcarriers and the sampling frequency. For example, by using a different sampling frequency, a DVB-T (Digital Video Broadcasting-Terrestrial) device is capable of receiving signals broadcasted from a DVB-T station that is operating on a 6-, 7-, or 8-MHz bandwidth.

However, the change in the time-domain structure brings about a series of system problems. A varying sampling rate alters the symbol length, frame structure, guard time, prefix, and other time-domain properties, which adversely affects the system behavior and performance. For example, the MAC layer and even the layers above have to keep track of all the time-domain parameters in order to perform other network functions such as handoff, and thereby the complexity of the system will exponentially increase. In addition, the change in symbol length causes control and signaling problems and the change in the frame structure may cause unacceptable jitters in some applications such as voice over IP. A practical and feasible solution for multi-carrier communication with variable channel bandwidth is desirable.

DETAILED DESCRIPTION

The multi-carrier system mentioned here can be of any format such as OFDM, or Multi-Carrier Code Division Multiple Access (MC-CDMA). The presented methods can also be applied to downlink, uplink, or both, where the duplexing technique is either Time Division Duplexing (TDD) or Frequency Division Duplexing (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Multi-Carrier Communication System

Figure 1:
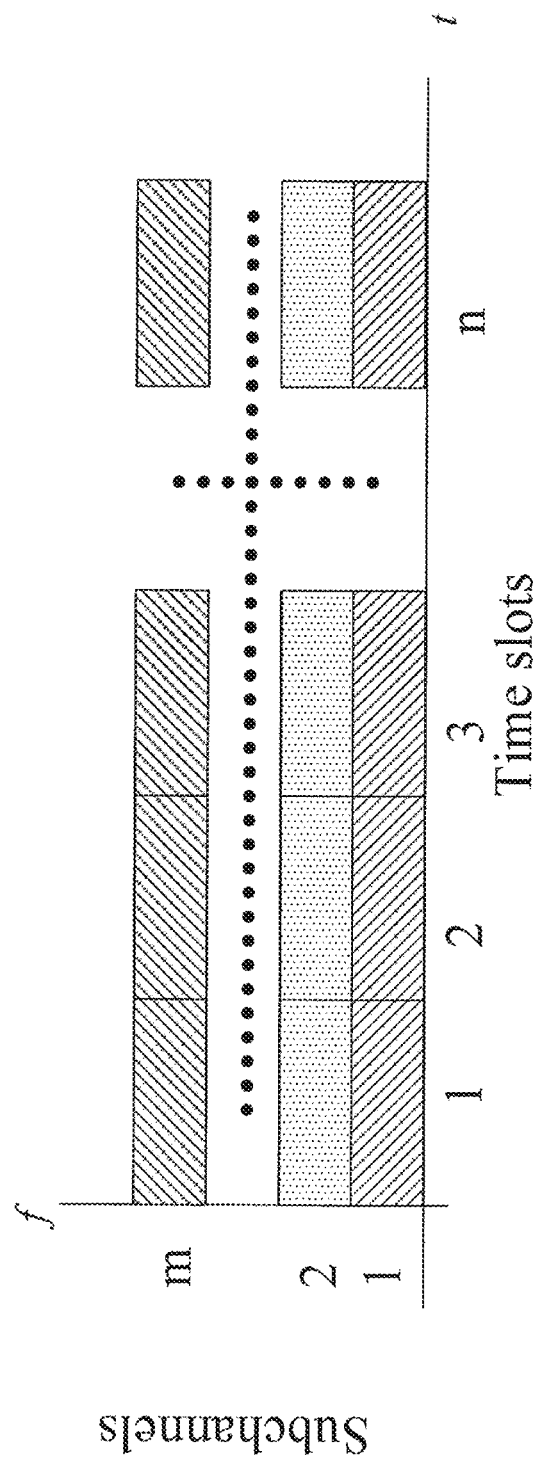
FIG. 1 is a schematic presentation of a radio resource divided into small units in both the frequency and time domains: subchannels and time slots.

The physical media resource (e.g., radio or cable) in a multi-carrier communication system can be divided in both the frequency and time domains. This canonical division provides a high flexibility and fine granularity for resource sharing. FIG. 1 presents a radio resource divided into small units in both the frequency and time domains—subchannels and time slots. The subchannels are formed by subcarriers.

Figure 2:
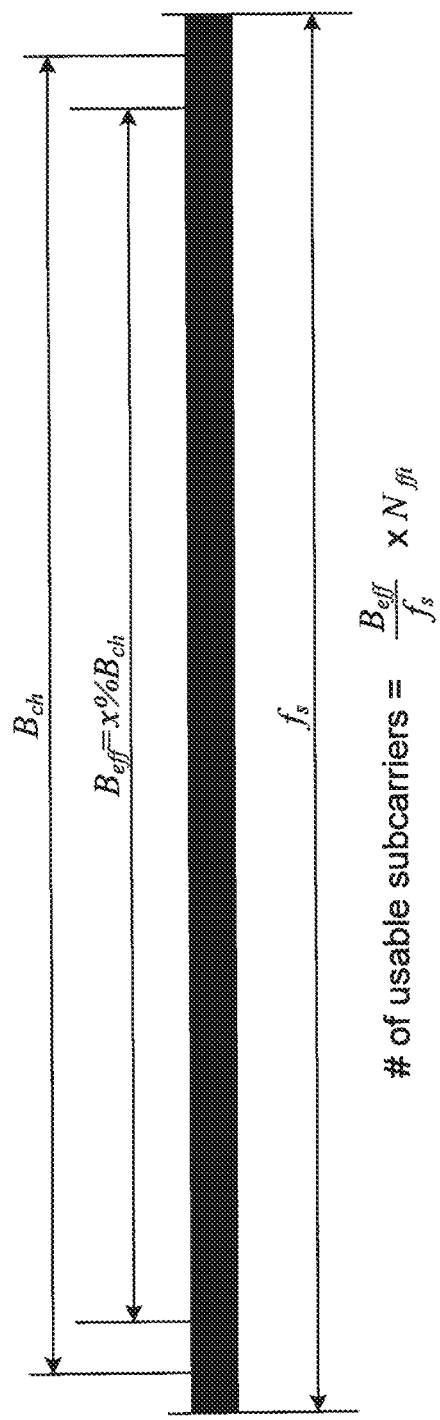
FIG. 2 illustrates a relationship between sampling frequency, channel bandwidth, and usable subcarriers.

The basic structure of a multi-carrier signal in the frequency domain is made up of subcarriers. For a given bandwidth of a spectral band or channel ($B_{ch}$) the number of usable subcarriers is finite and limited, whose value depends on a size of an FFT (Fast Fourier Transform) employed, a sampling frequency ($f_s$), and an effective bandwidth ($B_{eff}$). FIG. 2 illustrates a schematic relationship between the sampling frequency, the channel bandwidth, and the usable subcarriers. As shown, the $B_{eff}$ is a percentage of $B_{ch}$.

Figure 3:
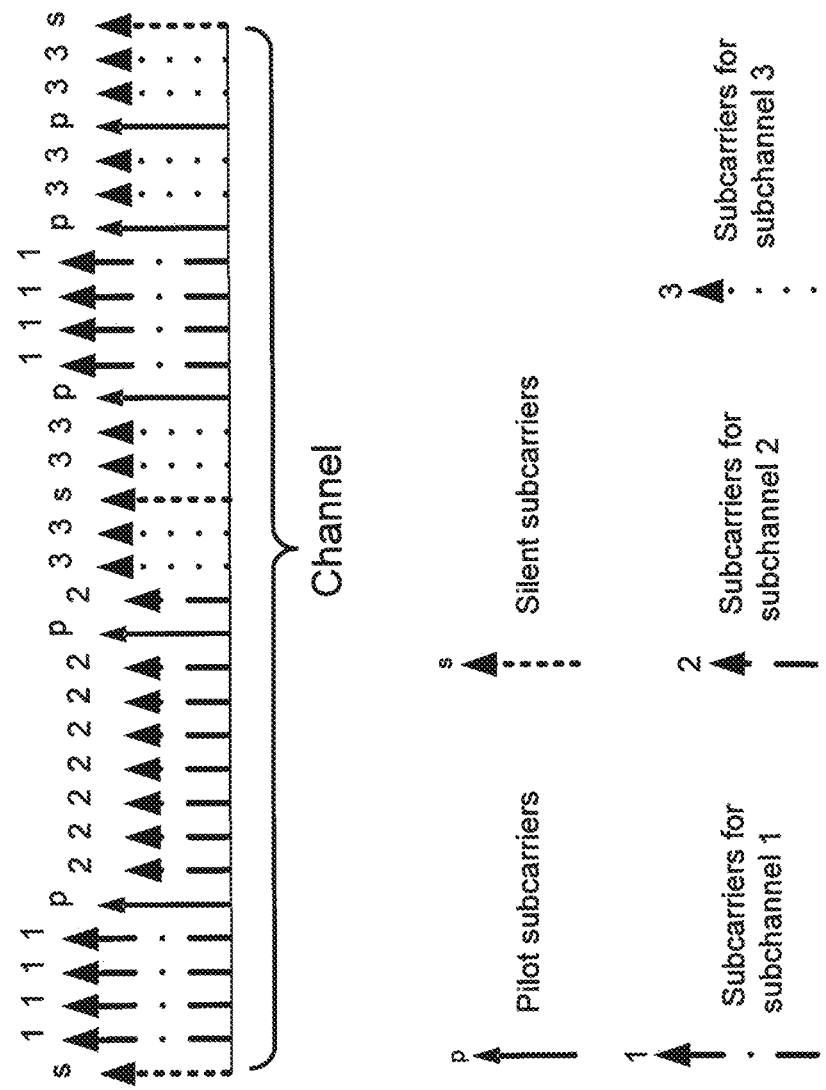
FIG. 3 shows a basic structure of a multi-carrier signal in the frequency domain, made up of subcarriers.

A basic structure of a multi-carrier signal in the frequency domain is made up of subcarriers and, illustrated in FIG. 3, which shows three types of subcarriers as follow:
1. Data subcarriers, which carry information data;
2. Pilot subcarriers, whose phases and amplitudes are predetermined and made known to all receivers, and which are used for assisting system functions such as estimation of system parameters; and
3. Silent subcarriers, which have no energy and are used as guard bands and DC carriers.

The data subcarriers can be arranged into groups called subchannels to support scalability and multiple-access. Each subchannel may be set at a different power level. The subcarriers forming one subchannel may or may not be adjacent to each other. Each user may use some or all of the subchannels. A subchannel formed by the contiguous subcarriers is called a congregated or clustered subchannel. A congregated subchannel may have a different power level from others.

Figure 4:
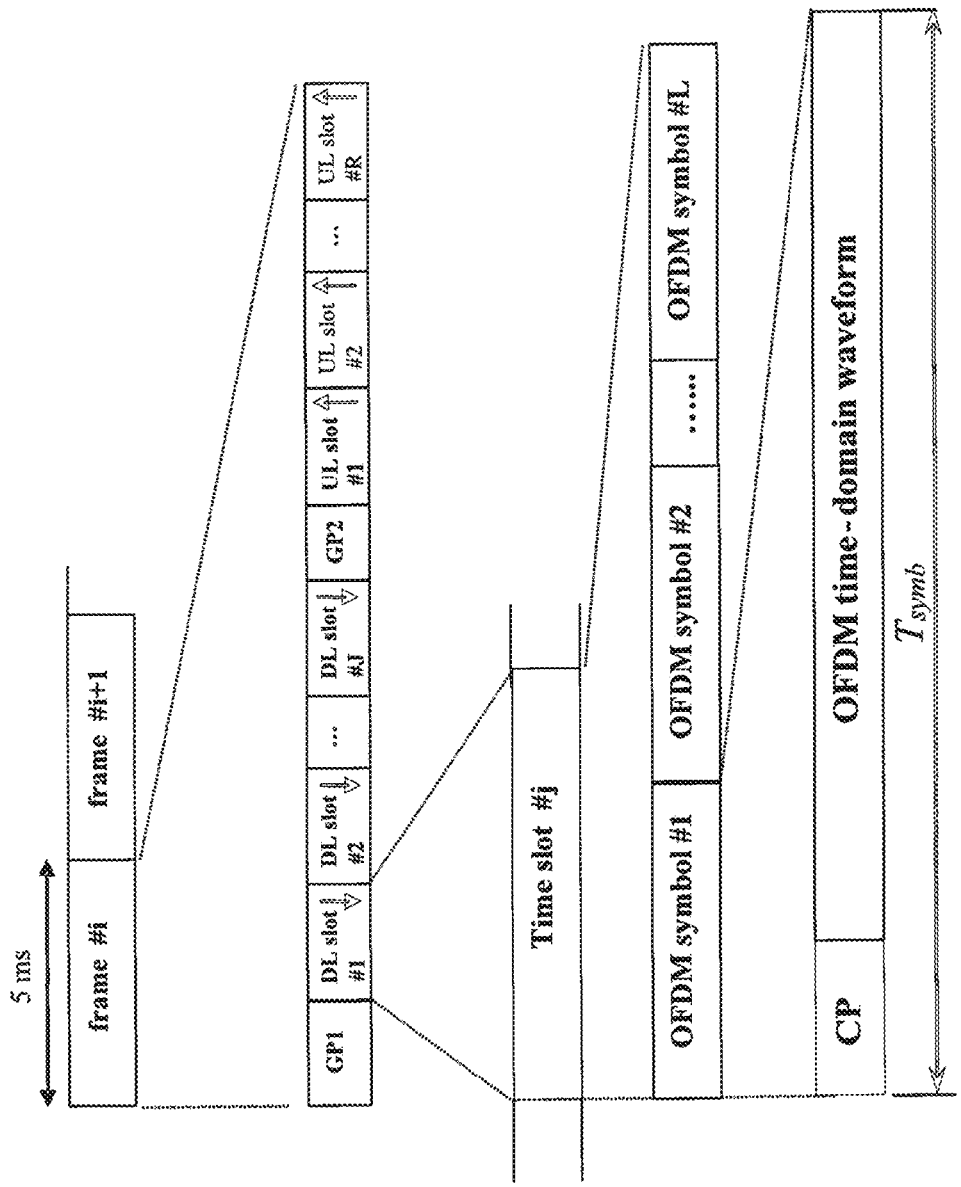
FIG. 4 shows a basic structure of a multi-carrier signal in the time domain, generally made up of time frames, time slots, and OFDM symbols.

FIG. 4 illustrates the basic structure of a multi-carrier signal in the time domain which is generally made up of time frames, time slots, and OFDM symbols. A frame consists of a number of time slots, whereas each time slot is comprised of one or more OFDM symbols. The OFDM time domain waveform is generated by applying the inverse-fast-Fourier-transform (IFFT) to the OFDM signals in the frequency domain. A copy of the last portion of the time waveform, known as the cyclic prefix (CP), is inserted at the beginning of the waveform itself to form an OFDM symbol.

The downlink transmission in each frame begins with a downlink preamble, which can be the first or more of the OFDM symbols in the first downlink (DL) slot. The DL preamble is used at a base station to broadcast radio network information such as synchronization and cell identification.

Similarly, uplink transmission can begin with an uplink preamble, which can be the first or more of the OFDM symbols in the first uplink (UL) slot. The UL preamble is used by mobile stations to carry out the functions such as initial ranging during power up and handoff, periodic ranging and bandwidth request, channel sounding to assist downlink scheduling or advanced antenna technologies, and other radio functions.

Cellular Wireless Networks

Figure 5:
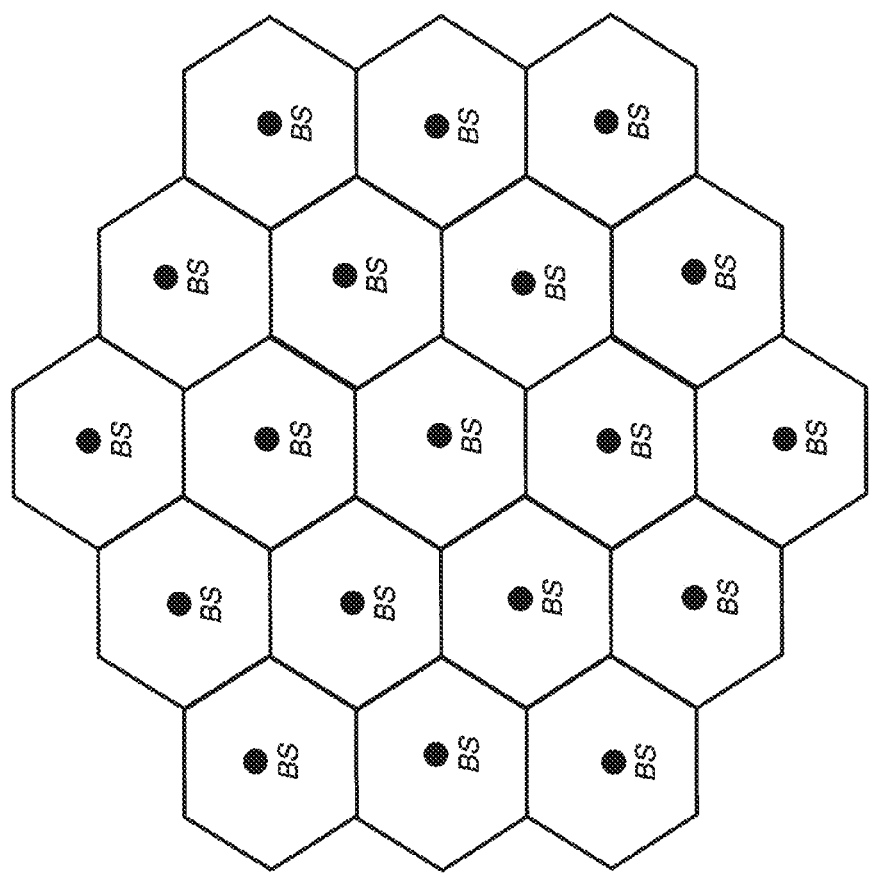
FIG. 5 shows a cellular wireless network comprised of a plurality of cells, wherein in each of the cells coverage is provided by a base station (BS).

In a cellular wireless network, the geographical region to be serviced by the network is normally divided into smaller areas called cells. In each cell the coverage is provided by a base station. This type of structure is normally referred to as the cellular structure. FIG. 5 depicts a cellular wireless network comprised of a plurality of cells. In each of these cells the coverage is provided by a base station (BS).

A base station is connected to the backbone of the network via a dedicated link and also provides radio links to the mobile stations within its coverage. Within each coverage area, there are located mobile stations to be used as an interface between the users and the network. A base station also serves as a focal point to distribute information to and collect information from its mobile stations by radio signals. If a cell is divided into sectors, from system engineering point of view each sector can be considered as a cell. In this context, the terms "cell" and "sector" are interchangeable.

Variable Bandwidth OFDMA

In accordance with aspects of certain embodiments of the invention, a variable bandwidth system is provided, while the time-domain signal structure (such as the OFDM symbol length and frame duration) is fixed regardless of the bandwidths. This is achieved by keeping the ratio constant between the sampling frequency and the length of FFT/IFFT. Equivalently, the spacing between adjacent subcarriers is fixed.

In some embodiments, the variable channel bandwidth is realized by adjusting the number of usable subcarriers. In the frequency domain, the entire channel is aggregated by subchannels. (The structure of a subchannel is designed in a certain way to meet the requirements of FEC (Forward Error Correction) coding and, therefore, should be maintained unchanged.) However, the number of subchannels can be adjusted to scale the channel in accordance with the given bandwidth. In such realization, a specific number of subchannels, and hence the number of usable subcarriers, constitute a channel of certain bandwidth.

Figure 6:
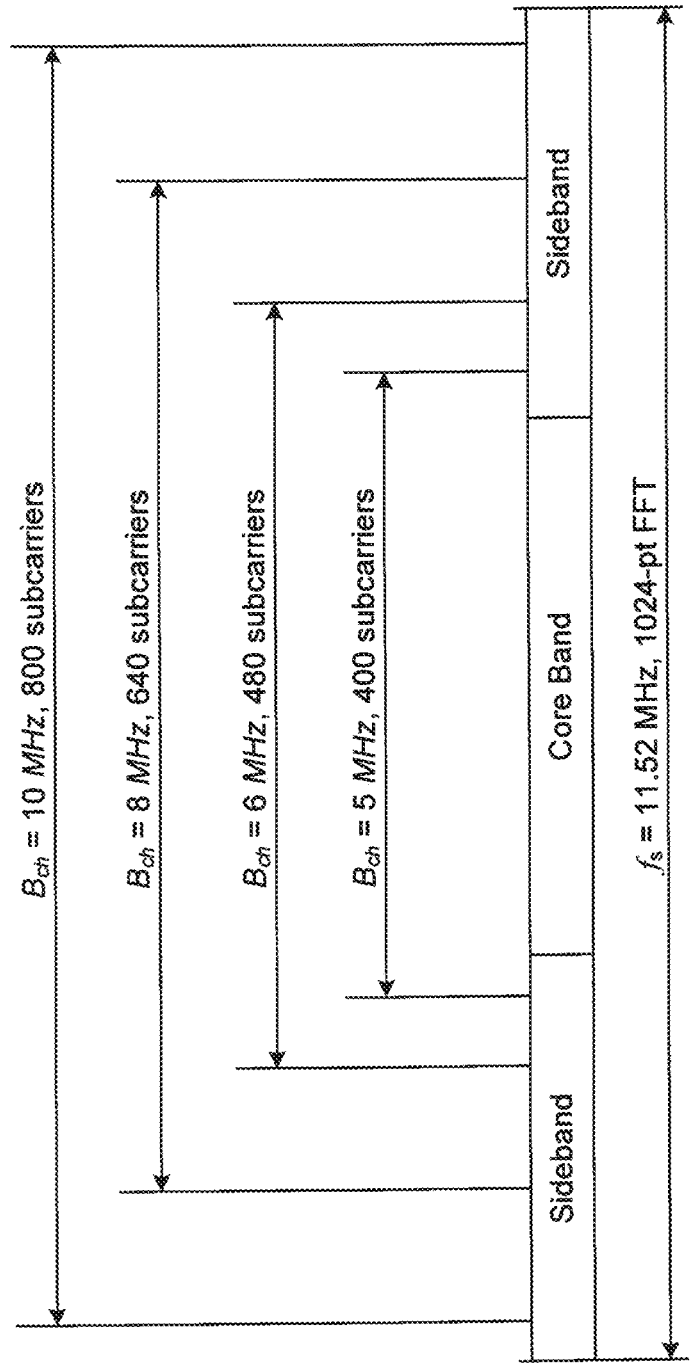
FIG. 6 illustrates a variable channel bandwidth being realized by adjusting a number of usable subcarriers, whose spacing is set constant.

For example, FIG. 6 illustrates the signal structure in the frequency domain for a communication system with parameters specified in Table 1 below. The numbers of usable subcarriers are determined based on the assumption that the effective bandwidth $B_{eff}$ is 90% of the channel bandwidth $B_{ch}$. The variable channel bandwidth is realized by adjusting the number of usable subcarriers, whose spacing is set constant. The width of a core-band is less than the smallest channel bandwidth in which the system is to operate.

TABLE 1

Sample System Parameters

| | | | | |
|---|---|---|---|---|
| Sampling freq. | | 11.52 | MHz | |
| FFT size | | 1024 | points | |
| Subcarrier spacing | | 11.25 | kHz | |
| Channel bandwidth | 10 MHz | 8 MHz | 6 MHz | 5 MHz |
| # of usable subcarriers | 800 | 640 | 480 | 400 |

Figure 7:
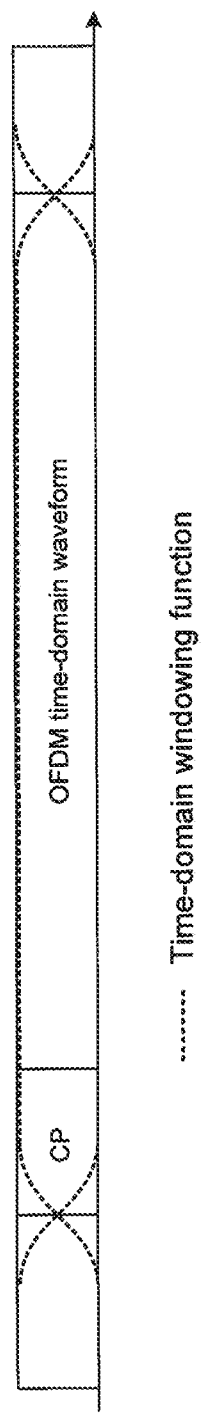
FIG. 7 depicts a time-domain windowing function applied to OFDM symbols to shape the OFDM spectrum to conform to a given spectral mask.

In this realization, using the invariant OFDM symbol structure allows the use of same design parameters for signal manipulation in the time-domain for a variable bandwidth. For example, in an embodiment depicted in FIG. 7, a particular windowing design shapes the spectrum to conform to a given spectral mask and is independent of the operating bandwidth.

Radio Operation Via Core-Band

To facilitate the user terminals to operate in a variable bandwidth (VB) environment, specific signaling and control methods are required. Radio control and operation signaling is realized through the use of a core-band (CB). A core-band, substantially centered at the operating center frequency, is defined as a frequency segment that is not greater than the smallest operating channel bandwidth among all the possible spectral bands that the receiver is designed to operate with. For example, for a system that is intended to work at 5-, 6-, 8-, and 10-Mhz, the width of the CB can be 4 MHz, as shown in FIG. 6. The rest of the bandwidth is called sideband (SB).

In one embodiment relevant or essential radio control signals such as preambles, ranging signals, bandwidth request, and/or bandwidth allocation are transmitted within the CB. In addition to the essential control channels, a set of data channels and their related dedicated control channels are placed within the CB to maintain basic radio operation. Such a basic operation, for example, constitutes the primary state of operation. When entering into the network, a mobile station starts with the primary state and transits to the normal full-bandwidth operation to include the sidebands for additional data and radio control channels.

Figure 8:
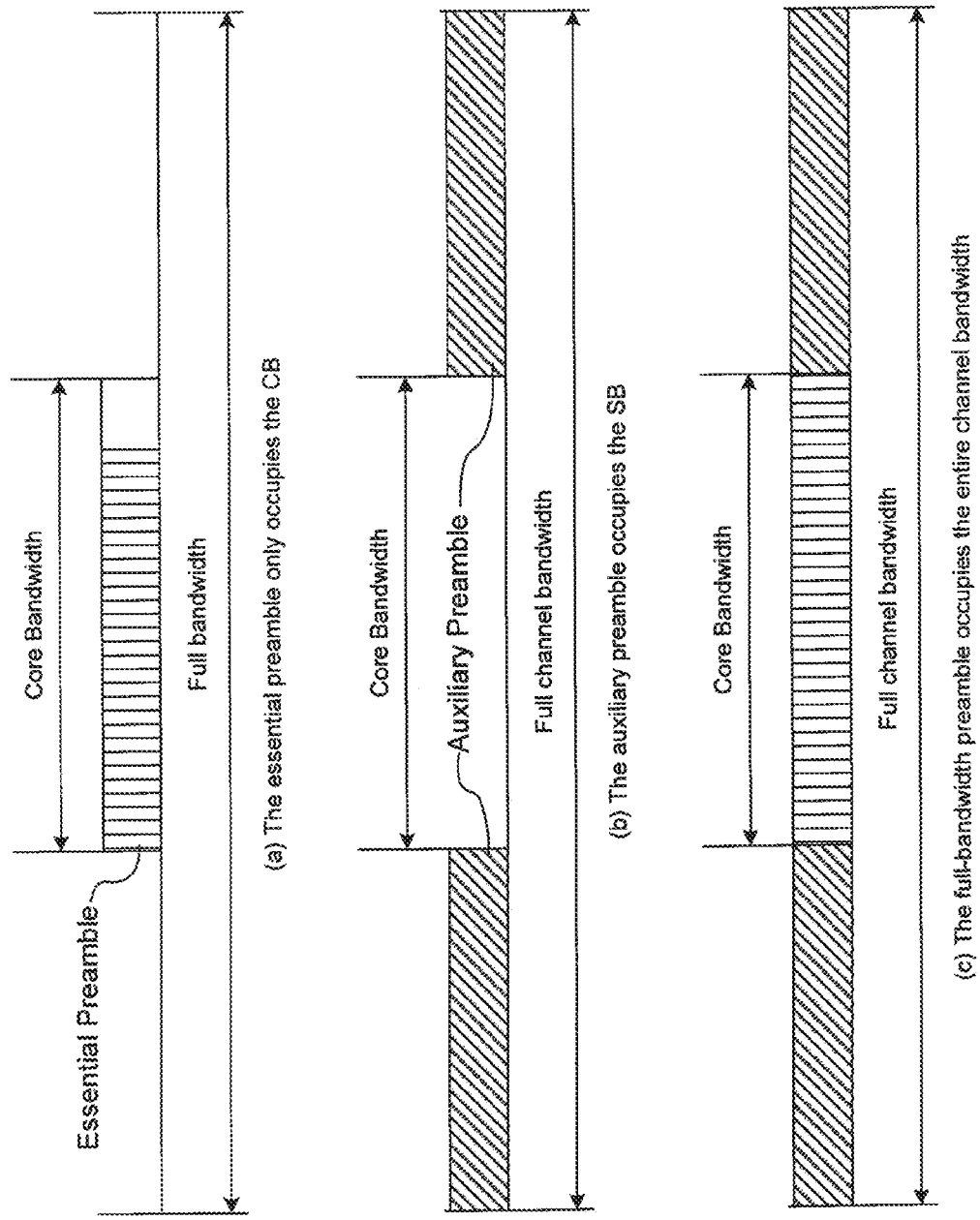
FIG. 8 depicts a preamble designed to occupy either an entire operating bandwidth or a core-band.

In another embodiment, a preamble, called an essential, or primary preamble (EP), is designed to only occupy the CB, as depicted in FIG. 8. The EP alone is sufficient for the basic radio operation. The EP can be either a direct sequence in the time domain with its frequency response confined within the CB, or an OFDM symbol corresponding to a particular pattern in the frequency domain within the CB. In either case, an EP sequence may possess some or all of the following properties:
1. Its autocorrelation exhibits a relatively large ratio between the correlation peak and sidelobe levels.
2. Its cross-correlation coefficient with another EP sequence is significantly small with respect to the power of the EP sequences.
3. Its peak-to-average ratio is relatively small.
4. The number of EP sequences that exhibit the above three properties is relatively large.

In yet another embodiment, a preamble, called an auxiliary preamble (AP), which occupies the SB, is combined with the EP to form a full-bandwidth preamble (FP) (e.g., appended in the frequency domain or superimposed in the time domain). An FP sequence may possess some or all of the following properties:
1. Its autocorrelation exhibits a relatively large ratio between the correlation peak and sidelobe levels.
2. Its cross-correlation coefficient with another FP sequences is significantly small with respect to the power of the FP sequences.
3. Its peak-to-average ratio is relatively small.
4. The number of FP sequences that exhibits the above three properties is relatively large.

In still another embodiment, the formation of an FP by adding an AP allows a base station to broadcast the FP, and a mobile station to use its corresponding EP, to access this base station. An FP sequence may also possess some or all of the following properties:
1. Its correlation with its own EP exhibits a relatively large ratio between the correlation peak and sidelobe levels.
2. Its cross-correlation coefficient with any EP sequence other than its own is significantly small with respect to its power.
3. The number of FP sequences that exhibit the above two properties is relatively large.

Automatic Bandwidth Recognition

The VB-OFDMA receiver is capable of automatically recognizing the operating bandwidth when it enters in an operating environment or service area of a particular frequency and channel bandwidth. The bandwidth information can be disseminated in a variety of forms to enable Automatic Bandwidth Recognition (ABR).

In one embodiment, a mobile station, when entering in an environment or an area that supports the VB operation or services, will scan the spectral bands of different center frequencies. If it detects the presence of a signal in a spectral band of a particular center frequency by using envelope detection, received signal strength indicator (RSSI), or by other detection methods, it can determine the operating channel bandwidth by bandwidth-center frequency association such as table lookup. For example, a table such as Table 2 is stored in the receiver. Based on the center frequency that it has detected, the mobile station looks up the value of the channel bandwidth from the table.

TABLE 2

Sample Center Frequency and Corresponding Bandwidth

| Center frequency | Channel Bandwidth |
| --- | --- |
| 2.31 GHz | 10 MHz |
| 2.56 GHz | 6 MHz |
| 2.9 G | 8 MHz |

In another embodiment, the system provides the bandwidth information via downlink signaling, such as using a broadcasting channel or a preamble. When entering into a VB network, the mobile stations will scan the spectral bands of different center frequencies in which the receiver is designed to operate and decode the bandwidth information contained in the broadcasting channel or preamble.

Multi-Mode (Multi-Range) VB-OFDMA

In accordance with the principles of this invention, multi-modes are devised for a VB-OFDMA system to handle an exceptionally wide range of variation in channel bandwidth. The entire range of bandwidth variation is divided into smaller parts—not necessarily in equal size—each of which will be dealt with as a separate mode or range.

Figure 9:
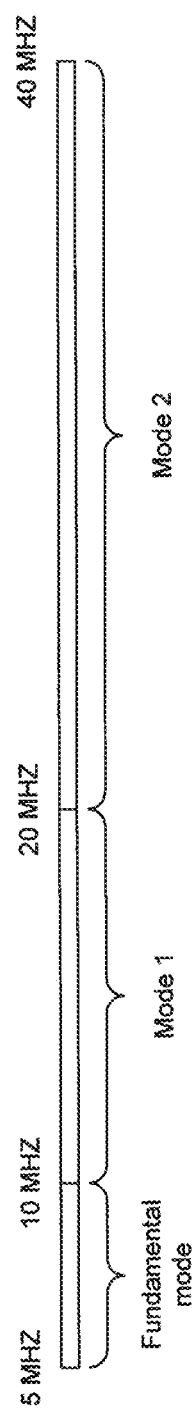
FIG. 9 shows an entire range (e.g., from 5 Mhz to 40 MHz) of bandwidth variation being divided into smaller groups or trunks (e.g., 5-10 MHz, 10-20 MHz, 20-40 MHz, in sizes), wherein each trunk is handled in one particular range.

FIG. 9 illustrates the entire range (e.g., from 5 MHz to 40 MHz) of bandwidth variation being divided into smaller parts (e.g., 5-10 MHz, 10-20 MHz, 20-40 MHz, in sizes). Each part is handled in one particular mode. The mode for the lowest range of bandwidth is labeled as "fundamental mode" and other modes are called "higher modes" (Mode 1, Mode 2, etc.).

The sampling frequency of a higher mode is higher than the sampling frequency of the fundamental mode. In one embodiment the sampling frequency of a higher mode is a multiple of the sampling frequency of the fundamental mode. In this embodiment, in the higher modes, the FFT size can be multiplied in accordance with the sampling frequency, thereby maintaining the time duration of the OFDM symbol structure. For example, the parameters for the case of a multi-mode design are given in Table 3. Alternatively, a higher mode can be realized by maintaining the FFT size and shortening the OFDM symbol duration accordingly. For example, for Mode 1 in Table 3, the FFT size can be maintained at 1024, whereas the sampling frequency is doubled and the symbol length is a half of that for the fundamental range. Yet another higher-mode realization is to both increase the FFT size and shorten the symbol duration accordingly. For example, for Mode 2 (20 MHz to 40 MHz in bandwidth), both the FFT size and the sampling frequency can be doubled as those of the fundamental range, whereas the symbol length is halved as that of the fundamental range. The width of the CB in a multi-mode VB-OFDMA system may not be greater than the smallest bandwidth in the fundamental mode.

TABLE 3

Sample System Parameters

|  | Mode 1 | | | | Fundamental-Mode | | | |
| --- | --- | --- | --- | --- | --- | --- | --- | --- |
| Sampling freq | 23.04 MHz | | | | 11.52 MHz | | | |
| FFT size | 2048 points | | | | 1024 points | | | |
| Subcarrier spacing | | | | 11.25 kHz | | | | |
| Channel bandwidth (MHz) | 20 | 18 | 15 | 12 | 10 | 8 | 6 | 5 |
| # of usable subcarriers | 1600 | 1440 | 1200 | 960 | 800 | 680 | 480 | 400 |

Figure 10:
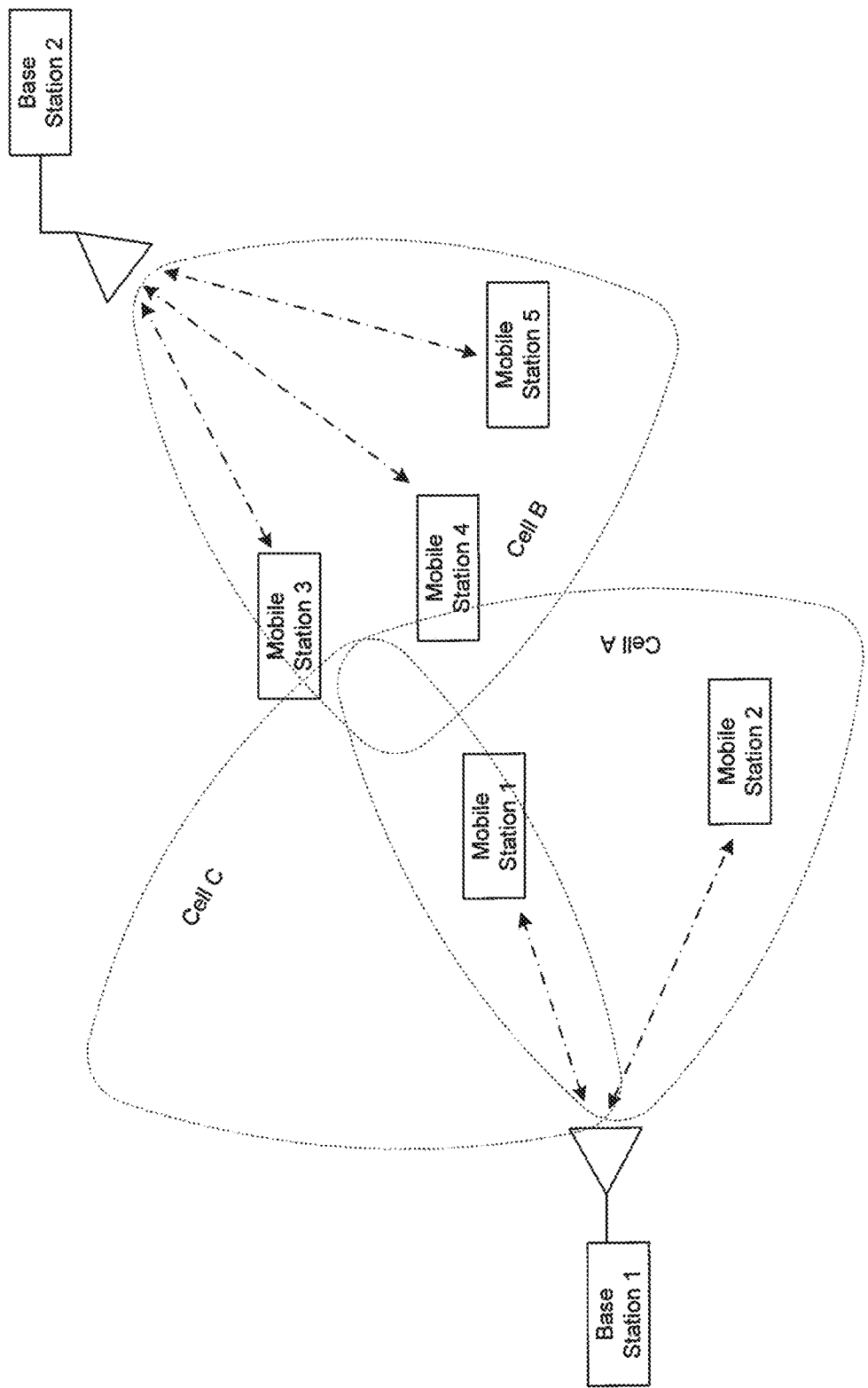
FIG. 10 illustrates a multi-cell, multi-user cellular system comprising multiple base stations and mobile stations.

FIG. 10 illustrates a multi-cell, multi-user cellular system comprising multiple base stations and mobile stations. The system of FIG. 10 is an example of an environment in which the attributes of the invention can be utilized.

While specific circuitry may be employed to implement the above embodiments, aspects of the invention can be implemented in a suitable computing environment. Although not required, aspects of the invention may be implemented as computer-executable instructions, such as routines executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the term "computer" refers to any of the above devices and systems, as well as any data processor.

Aspects of the invention can be embodied in a special purpose computer or data processor that is specifically programmed, configured, or constructed to perform one or more of the processes explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects or the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The above detailed description of the embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes are presented in a given order, alternative embodiments may perform routines having steps in a different order, and some processes may be deleted, moved, added, subdivided, combined, and/or modified. Each of these processes may be implemented in a variety of different ways.

The teachings provided herein can be applied to other systems, not necessarily the system described herein. The elements and acts of the various embodiments described above can be combined to provide further embodiments. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A cellular base station, comprising:

circuitry configured to transmit a broadcast channel in an orthogonal frequency division multiple access (OFDMA) core-band, wherein the core-band is substantially centered at an operating center frequency and the core-band includes a first plurality of subcarrier groups, wherein each subcarrier group includes a plurality of subcarriers, the core-band defined as a frequency segment with a bandwidth that is not greater than a smallest operating channel bandwidth among a plurality of operating channel bandwidths, the core-band having a same value for the plurality of operating channel bandwidths, wherein the circuitry is further configured to maintain a fixed spacing between adjacent subcarriers and to adjust a number of usable subcarriers to realize a variable band, wherein the number of usable subcarriers is determined based on the plurality of operating channel bandwidths; and circuitry configured to transmit control and data channels using the variable band including a second plurality of subcarrier groups, wherein the variable band includes at least the core-band.

2. The cellular base station of claim 1, wherein the circuitry configured to transmit the broadcast channel is further configured to transmit radio network information in the broadcast channel.

3. The cellular base station of claim 1, further comprising circuitry configured to transmit synchronization information in the core-band.

4. The cellular base station of claim 1, wherein the circuitry configured to transmit the broadcast channel is further configured to transmit in a time slot format.

5. The cellular base station of claim 1, wherein the base station operates in an OFDMA frequency division duplex (FDD) or time division duplex (TDD) mode.

6. A variable bandwidth communication method, comprising:

receiving synchronization information by a cellular mobile station from a base station in an orthogonal frequency division multiple access (OFDMA) core-band, wherein the core-band is substantially centered at an operating center frequency and the core-band includes a first plurality of subcarrier groups where each subcarrier group includes a plurality of subcarriers having a fixed spacing between adjacent subcarriers, wherein a number of usable subcarriers is adjustable to realize a variable band, wherein the number of usable subcarriers is determined based on a plurality of operating channel bandwidths, the core-band defined as a frequency segment with a bandwidth that is not greater than a smallest operating channel bandwidth among the plurality of operating channel bandwidths, the core-band having a same value for the plurality of operating channel bandwidths, wherein the cellular mobile station is configured to operate within the plurality of operating channel bandwidths;

synchronizing the cellular mobile station with the base station using the received synchronization information; and receiving control and data channels by the cellular mobile station using the variable band including a second plurality of subcarrier groups, wherein the variable band includes at least the core-band.

7. The method of claim 6, wherein the receiving of the synchronization information by the cellular mobile station from the base station in the core-band includes receiving cell identification information from the base station in the core-band.

8. The method of claim 6, further comprising receiving by the cellular mobile station a broadcast channel in the core-band.

9. The method of claim 8, wherein the broadcast channel carries radio network information.

10. The method of claim 6, further comprising transmitting by the cellular mobile station a preamble after synchronizing with the base station.

11. A mobile station, comprising:

circuitry configured to receive broadcast information to access an orthogonal frequency division multiple access (OFDMA) system, wherein the broadcast information is received only in a first band having a first bandwidth and the broadcast information is carried by a plurality of groups of subcarriers with each group having a plurality of contiguous subcarriers; and circuitry configured to determine a second bandwidth of a second band that is associated with the OFDMA system based upon the broadcast information received in the first band, wherein a second bandwidth of the second band is greater than the first bandwidth of the first band, wherein the first band is contained within the second band, wherein a data channel is carried by at least one subcarrier group of the second band, wherein the plurality of contiguous subcarriers have fixed spacing, wherein a number of usable subcarriers is adjustable to realize a variable band, wherein the number of usable subcarriers is determined based on a plurality of operating channel bandwidths, and wherein the first band is defined as a frequency segment with a bandwidth that is not greater than a smallest operating channel bandwidth among the plurality of operating channel bandwidths, the first band having a same value for the plurality of operating channel bandwidths wherein the mobile station is configured to operate within the plurality of operating channel bandwidths.

12. The mobile station of claim 11, further comprising circuitry configured to receive a preamble that carries information on sector identity or cell identity.

13. The mobile station of claim 11, further comprising circuitry configured to receive information about the second band to enable the mobile station to receive the data channel.

14. The mobile station of claim 11, further comprising circuitry configured to receive synchronization information, cell identification information, or radio network information from the first band.

15. The mobile station of claim 11, further comprising circuitry configured to transmit a first preamble or a second preamble in a ranging or sounding operation, wherein the second preamble includes part of the first preamble.

16. The mobile station of claim 15, wherein the first and second preambles are OFDM symbols and the preambles comprise a predetermined sequence or pattern.

17. The mobile station of claim 11, further comprising circuitry configured to transmit a first preamble or a second preamble in a ranging or sounding operation, wherein the second preamble is larger than the first preamble.

18. The mobile station of claim 11, further comprising circuitry configured to receive a first symbol and a second symbol from the first band, wherein the first symbol and the second symbol are synchronization information symbols.

19. The mobile station of claim 18, wherein the synchronization information symbols are derived from a sequence that has a low cross correlation with other sequences used for other synchronization information symbols.

20. The mobile station of claim 19, wherein the sequence has a low peak to average ratio.

21. The mobile station of claim 11, wherein the sequence is selected from a plurality of sequences.

22. The mobile station of claim 11, further comprising circuitry configured to receive at least one symbol from the first band that includes a cell identification of a base station.

23. The mobile station of claim 11, wherein the received data channel is in a time slot format.

24. The mobile station of claim 11, wherein the OFDMA system operates in an OFDMA frequency division duplex (FDD) or time division duplex (TDD) mode.

25. A method performed by a mobile station, comprising:
receiving broadcast information by the mobile station to access an orthogonal frequency division multiple access (OFDMA) system, wherein the broadcast information is received only in a first band having a first bandwidth and the broadcast information is carried by a plurality of groups of subcarriers with each group having a plurality of contiguous subcarriers;
determining a second bandwidth of a second band that is associated with the OFDMA system based upon the broadcast information received in the first band, wherein a second bandwidth of the second band is greater than the first bandwidth of the first band; and
based upon the determination of the second bandwidth, receiving the second band,
wherein the first band is contained within the second band,
wherein a data channel is carried by at least one subcarrier group of the second band,
wherein the plurality of contiguous subcarriers have fixed spacing,
wherein a number of usable subcarriers is adjustable to realize a variable band, wherein the number of usable subcarriers is determined based on a plurality of operating channel bandwidths, and
wherein the first band is defined as a frequency segment with a bandwidth that is not greater than a smallest operating channel bandwidth among the plurality of operating channel bandwidths, the first band having a same value for the plurality of operating channel bandwidths, wherein the mobile station is configured to operate within the plurality of operating channel bandwidths.

26. The method of claim 25, further comprising receiving a preamble that carries information on sector identity or cell identity.

27. The method of claim 25, further comprising receiving information about the second band to enable the mobile station to receive the data channel.

28. The method of claim 25, further comprising receiving synchronization information, cell identification information, or radio network information from the first band.

29. The method of claim 25, further comprising transmitting a first preamble or a second preamble in a ranging or sounding operation, wherein the second preamble includes part of the first preamble.

30. The method of claim 29, wherein the first and second preambles are OFDM symbols and the preambles comprise a predetermined sequence or pattern.

31. The method of claim 25, further comprising transmitting a first preamble or a second preamble in a ranging or sounding operation, wherein the second preamble is larger than the first preamble.

32. The method of claim 25, further comprising receiving a first symbol and second symbol from the first band, wherein the first symbol and the second symbol are synchronization information symbols.

33. The method of claim 32, wherein the synchronization information symbol is derived from a sequence that has a low cross correlation with other sequences used for other synchronization information symbols.

34. The method of claim 33, wherein the sequence has a low peak to average ratio.

35. The method of claim 33, wherein the sequence is selected from a plurality of sequences.

36. The method of claim 25, further comprising receiving at least one symbol from the first band that includes a cell identification of a base station.

37. The method of claim 25, wherein the received data channel is in a time slot format.

38. The method of claim 25, wherein the OFDMA system operates in an OFDMA frequency division duplex (FDD) or time division duplex (TDD) mode.

* * * * *